(12) United States Patent
Wigren

(10) Patent No.: US 8,787,858 B2
(45) Date of Patent: Jul. 22, 2014

(54) METHOD AND DEVICE FOR NOISE FLOOR ESTIMATION

(75) Inventor: Torbjörn Wigren, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/988,684

(22) PCT Filed: Nov. 30, 2010

(86) PCT No.: PCT/SE2010/051323
§ 371 (c)(1),
(2), (4) Date: May 21, 2013

(87) PCT Pub. No.: WO2012/074445
PCT Pub. Date: Jun. 7, 2012

(65) Prior Publication Data
US 2013/0244603 A1    Sep. 19, 2013

(51) Int. Cl.
*H04B 17/00* (2006.01)
*H04B 1/00* (2006.01)

(52) U.S. Cl.
USPC .................. 455/226.1; 455/63.1; 455/67.13

(58) Field of Classification Search
CPC .. H04W 24/00; H04W 24/02; H04B 17/0042; H04B 17/0055; H04B 17/0057
USPC ........... 455/63.1, 67.11, 67.13, 226.1, 226.2, 455/226.3
See application file for complete search history.

(56) References Cited

U.S. PATENT DOCUMENTS

| | | | | |
|---|---|---|---|---|
| 5,799,243 A | * | 8/1998 | Ojaniemi | 455/63.1 |
| 7,103,316 B1 | * | 9/2006 | Hall | 455/63.1 |
| 7,636,322 B1 | | 12/2009 | Gandhi et al. | |
| 8,005,433 B2 | * | 8/2011 | Wigren | 455/67.13 |
| 8,090,043 B2 | * | 1/2012 | Levi et al. | 375/267 |

(Continued)

FOREIGN PATENT DOCUMENTS

| | | |
|---|---|---|
| GB | 2425684 A | 1/2006 |
| WO | 9829961 A2 | 7/1998 |

(Continued)

OTHER PUBLICATIONS

Wigren, Torbjorn; "Soft Uplink Load Estimation in WCDMA", IEEE Transactions on Vehicular Technology, Feb. 2009, pp. 760-772, vol. 58, No. 2; Vehicular Technology, IEEE Transactions.

(Continued)

*Primary Examiner* — Quochien B Vuong
(74) *Attorney, Agent, or Firm* — Coats & Bennett, P.L.L.C.

(57) ABSTRACT

A method for determining the noise floor in a receiver includes sorting received estimated values of the noise floor by time bins in a time cycle, determining and storing the average value of the received values in each time bin for a previous time cycle, and determining a scale factor for each time bin in the current time cycle by dividing the average value of each time bin in the previous time cycle by the smallest average value of the time bins in the previous time cycle. The division for time bin k in the previous time cycle is used as scale factor for time bin k in the current time cycle. A compensated noise floor power level for each time bin in the current time cycle may be determined by applying the scale factor of the current time bin to the currently received estimated value.

16 Claims, 7 Drawing Sheets

(56) References Cited

U.S. PATENT DOCUMENTS

| | | | |
|---|---|---|---|
| 8,175,537 B2 * | 5/2012 | Wigren | 455/67.13 |
| 8,301,083 B2 * | 10/2012 | Wigren | 455/67.13 |
| 8,306,091 B2 * | 11/2012 | Wigren | 455/67.13 |
| 2004/0092281 A1 | 5/2004 | Burchfiel | |
| 2007/0105501 A1 | 5/2007 | Shen et al. | |

FOREIGN PATENT DOCUMENTS

| | | |
|---|---|---|
| WO | 2006076969 A1 | 7/2006 |
| WO | 2007117188 A1 | 10/2007 |
| WO | 2008039123 A1 | 4/2008 |
| WO | 2009038508 A1 | 3/2009 |

OTHER PUBLICATIONS

Wigren, Torbjorn and Hellqvist, Per; "Estimation of uplink WCDMA load in a single RBS", IEEE, Vehicular Technology Conference, 2007, pp. 1499-1503, IEEE 66th; VTC-2007, Sep. 30, 2007-Oct. 3, 2007, Baltimore, MD.

Holma, H. and Toskala, A., "WCDMA for UMTS—Radio Access for Third Generation Mobile Communications", Section 9.4 to 9.6; 2000; pp. 210-218; United Kingdom; http://www.amazon.com/WCDMA-UMTS-Generation-Communications-Revised/dp/0471486876.

* cited by examiner

| Performance metric | Without scale factor [dBm/dB/dB^2] | With scale factor [dBm/dB/dB^2] |
|---|---|---|
| Mean noise floor | -106.2091 | -106.5914 |
| Max noise floor | -105.4092 | -105.8670 |
| Mean error | 0.2909 | -0.0914 |
| Max absolute error | 1.0908 | 0.6330 |
| Standard deviation | 0.2916 | 0.1970 |
| Minimum mean square error | 0.1696 | 0.0084 |

METHOD AND DEVICE FOR NOISE FLOOR ESTIMATION

TECHNICAL FIELD

The present invention discloses a method and a device for improved estimation of the noise floor power level in a radio receiver.

BACKGROUND

An accurate estimate of the momentary air interface load of the uplink in a cellular system such as a WCDMA system is necessary in order to enable accurate scheduling of users of the uplink, exemplified by the enhanced uplink, EUL, in WCDMA and for the accurate admission of new users of the WCDMA uplink. Inaccuracies in the estimation of the momentary air interface load of the WCDMA uplink will result in a reduction of the throughput of the WCDMA EUL uplink.

The air interface load is expressed as a so called noise rise, i.e. the total amount of (relevant) interference power, divided by the thermal noise of the WCDMA uplink receiver. From this, it follows that in order to obtain an accurate estimation of the air interface load, it is also necessary to obtain an accurate estimation of the thermal "noise floor" in the receiver—due, for example, to the fact that variations in electronics components result in thermal noise floor variations of 1-3 dB between different uplink receivers, i.e. NodeBs with the continued use of a WCDMA system as an example, and also due to the fact that factory calibration would be costly as well as being uncertain due to highly varying installation procedures and corresponding variations in cabling losses.

Estimation of the thermal noise floor in the receiver in a WCDMA NodeB is a difficult problem, one of the sources of the difficulty being that it is not possible to distinguish between interference from neighboring cells and the receiver's internal noise, i.e. the receiver's thermal noise.

Interference from neighboring cells will thus often cause an estimation of the receiver's internal noise floor to be too high. In addition, the amount of interference from neighboring cells varies over time, a fact that sometimes allows for accurate noise floor estimation and sometimes not. A remedy for time-varying interference from neighbouring cells would of course be to extend the period of time over which the internal noise floor is estimated. However, this has two distinct drawbacks: first of all, the bandwidth of the noise floor estimator will be reduced, and secondly, the amount of data needed for the estimations is increased.

In addition, the "always connected" ambition of the cellular industry, together with the ambition to have a large number of users, e.g. smart phones and machines, which simultaneously use the uplink will make the problem of "seeing" the internal noise floor in a receiver in a NodeB much worse in the future, due to the fact that "always connected" devices will transmit with low intensity, and the large amounts of such users will greatly reduce the variation of the uplink load, simply due to "the law of large numbers", thus making the interference level appear as slightly varying around a mean value that varies slowly.

There exist methods for estimating the internal noise floor in a receiver, but these known methods exhibit a number of disadvantages. Some known methods include so called bias estimation, and some don't. Known methods without bias estimation exhibits such disadvantages as providing estimates that are biased towards positive values and of providing estimates that vary substantially over time. Known methods with bias estimation exhibit disadvantages that include, for example, an inability to provide a sufficient amount of bias reduction, i.e. they are not accurate enough, in addition to which they do not provide bias estimations with a sufficiently high degree of resolution, e.g. by the hour per day, as well as being unable to provide bias estimations that perform differently for different weekdays, which would be necessary due to the fact that the uplink traffic intensity varies between, for example, weekdays and weekends. In addition, such known methods for estimating the internal noise floor in a receiver often rely on auxiliary measurements, which requires the development of auxiliary interfaces and signal transfer protocols.

In addition, as mentioned previously, known methods for estimating a receiver's internal noise floor are not able to cope with the "always connected" ambition of the cellular industry, in connection with the ambition to have large numbers of users, e.g. smart phones and machines, which simultaneously use the uplink.

SUMMARY

As has emerged from the text above, a problem within cellular technology such as, for example, WCDMA, is to properly determine the internal noise floor, here also referred to as the noise floor power level, in a receiver. This problem is addressed by the invention in that it discloses a method for determining the noise floor power level in a radio receiver, which comprises receiving estimated values of the noise floor power level and sorting the received estimated values by time bins.

The time bins are N predetermined portions of a predetermined time cycle, and the method also comprises determining the average value of the received values in each time bin for a previous time cycle.

In addition, the method also comprises determining a scale factor for each time bin k in the current time cycle by means of dividing the average value of each time bin k in the previous time cycle by the smallest average value of the time bins in the previous time cycle.

The result of the division for time bin k in the previous time cycle is used as scale factor for time bin k in the current time cycle, and the method further comprises determining a compensated noise floor power level for each time bin in the current time cycle by means of applying the scale factor of the current time bin to the currently received estimated value of the noise floor power level.

By means of the invention as will be shown in the following detailed text with reference to the appended drawings, an improved performance is obtained in determining the noise floor power level in a radio receiver in a cellular system such as, for example, WCDMA.

In some embodiments of the method, the received estimated values of the noise power floor are stored, and the average values of the time bins in the previous time cycle are determined from the stored received estimated values of the noise power floor.

In some embodiments of the method, the average value of the received values in each time bin for the previous time cycle are stored and the smallest average value of the time bins in the previous time cycle is determined when all of the average values of the time bins in the previous time cycle have been stored.

In some embodiments, the method also comprises determining and storing the average value of the received values in each time bin for the current time cycle for use in determining a scale factor for a coming time cycle. In some such embodiments of the method, the coming time cycle is the next time cycle.

In some embodiments of the method, the step of applying the scale factor of the current time bin to the currently received estimated value of the noise floor power level comprises dividing the currently received estimated value of the noise floor power level by the scale factor of the current time bin.

In some embodiments of the method, the previous time cycle used in determining the scale factor is the time cycle immediately preceding the current time cycle.

In some embodiments of the method, the predetermined time cycle is a 24 hour period and K equals 24.

The invention also discloses a device for determining the noise floor power level in a radio receiver. The device comprises an averaging component which is arranged to receive estimated values of the noise floor power level and to sort the received estimated values by time bins, where the time bins are N predetermined portions of a predetermined time cycle.

The averaging component is also arranged to determine the average value of the received values in each time bin for a previous time cycle, and the device also comprises a scale factor component arranged to receive from the averaging component the average values of the bins for the previous time cycle. The scale factor component is arranged to determine a scale factor for each time bin k in the current time cycle by dividing the average value of each time bin k in the previous time cycle by the smallest average value of the time bins in the previous time cycle, and to use the result of the division for time bin k in the previous time cycle as scale factor for time bin k in the current time cycle.

The device further comprises a determining component which is arranged to determine a compensated noise floor power level for each time bin in the current time cycle by means of applying the scale factor of the current time bin to the currently received estimated value of the noise floor power level.

In some embodiments, the averaging component is arranged to store the received estimated values of the noise power floor, and to determine the average values of the time bins in the previous time cycle from the stored received estimated values of the noise power floor.

In some embodiments, the device is also arranged to store the determined average values of the time bins in the previous time cycle, and to find the smallest average value of the time bins in the previous time cycle when all of the average values of the time bins in the previous time cycle have been stored.

In some embodiments, the device is also arranged to determine and store the average value of the received values in each time bin for the current time cycle for use in determining a scale factor for a coming time cycle. In some such embodiments, the coming time cycle is the next time cycle.

In some embodiments of the device, the determining component is arranged to apply the scale factor of the current time bin to the currently received estimated value of the noise floor power level by dividing the currently received estimated value of the noise floor power level by the scale factor of the current time bin.

In some embodiments, the previous time cycle which is used by the scale factor component in determining the scale factor is the time cycle immediately preceding the current time cycle.

In some embodiments of the device, the predetermined time cycle used by the averaging component is a 24 hour period, with K being set to equal 24.

BRIEF DESCRIPTION OF THE DRAWINGS

The invention will be described in more detail in the following, with reference to the appended drawings, in which FIGS. 4-7 show examples of results achieved by means of the invention.

DETAILED DESCRIPTION

Figure 1:
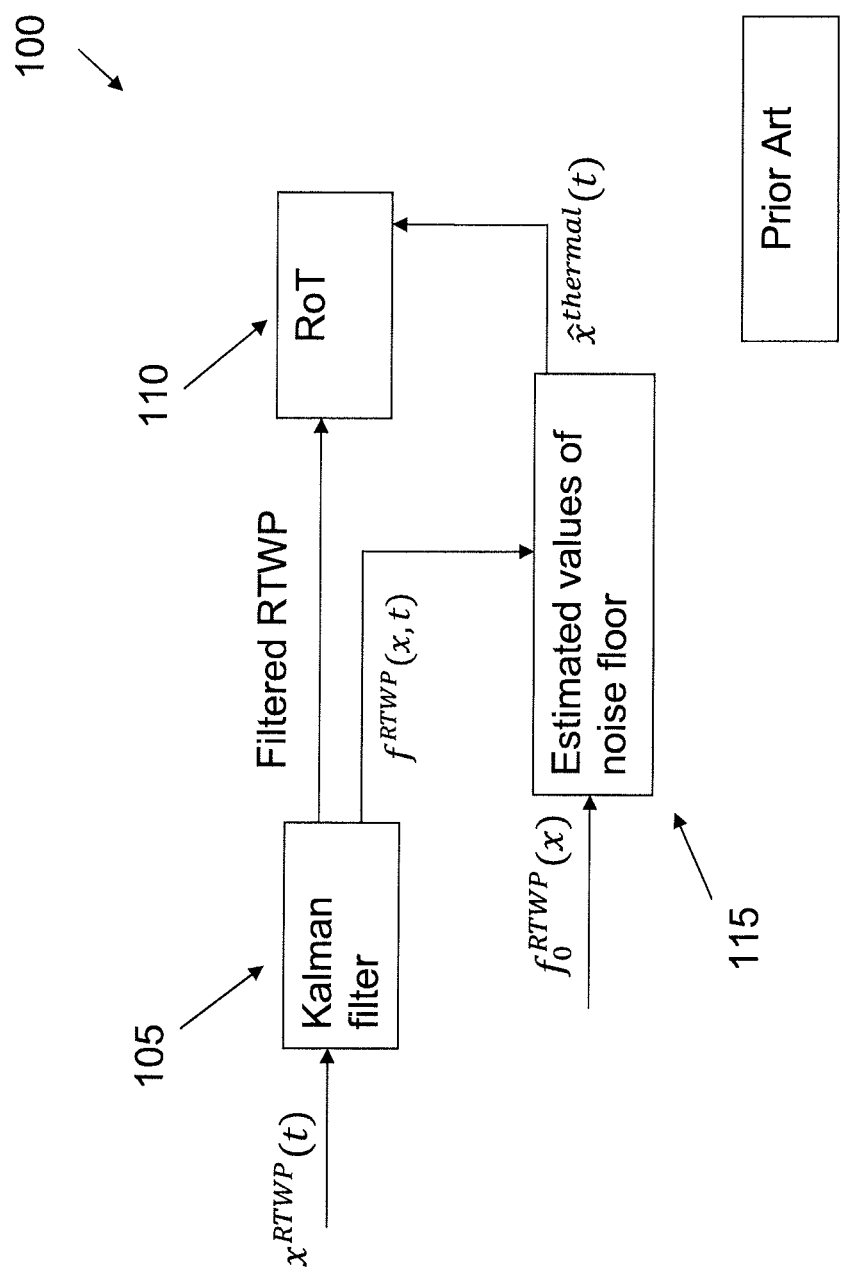
FIG. 1 shows an example of a prior art system for determining the noise power floor level in a radio receiver.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

First, a few terms used in this text will be defined: as stated, an object of the invention is to enable accurate determination of the noise floor power level in a radio receiver, i.e. the level of internal noise in the receiver caused by random fluctuations in electronic circuitry, which in turn is needed in order to enable an accurate determination of the receiver's so called RoT, Rise over Thermal, i.e. the current noise power level in the receiver as referred to the receiver's noise floor power level. The RoT value at time t, i.e. RoT(t), is defined as:

$$RoT(t) = \frac{RTWP(t)}{N(t)} \quad (1)$$

In (1) above, N(t) is the thermal noise level at an antenna connector of the radio receiver and RTWP(t) is the total wideband power at the antenna connector which is used in the definition of N(t). RTWP(t) is given by the following expression:

$$RTWP(t) = \sum_{k=1}^{K} P_k(t) + I^N(t) + N(t) \quad (2)$$

In (2) above, $I^N(t)$ denotes the power received in interference from neighbouring cells ($^N$) in the cellular system, for example a WCDMA system. A major difficulty when estimating the RoT in a radio receiver in a cellular system is to separate the receiver's noise floor power level from the interference which is received from neighboring cells.

As will be shown in the following, the invention discloses a method and a corresponding device for determining the noise floor power level of a radio receiver in a cellular system without undue influence from interference from neighbouring cells.

A simplified block diagram of a prior art system 100 for determining a radio receiver's RoT is shown in FIG. 1, and will be described here briefly: a Kalman filter 105 receives values of RTWP over time, shown as $X^{RTWP}(t)$, filters these values and delivers them to a component 110 for determining the RoT. The component 110 also receives estimates of the noise floor power level from an estimator 115, which can be an estimator which works on either, for example, a sliding window principle or a recursive estimator. The receiver's RoT can then be determined in the component 110 by means of comparing the filtered values of RTWP with the estimated values of the noise floor power level. In the example of an estimator 115 shown in FIG. 1, the Kalman filter 105 delivers to the estimator 115 values $f^{RTWP}(x, t)$ of the probability density function associated with an estimate x of the RTWP at a point in time t. The probability density function is Gaussian and is therefore fully defined by the covariance matrix and the mean, both quantities being estimated on line in the Kalman filter. In addition, the estimator 115 also uses an initial (i.e. t=0) value of $f_0^{RTWP}(X)$.

Prior art systems such as the one in FIG. 1 suffer from problems such as not being able to sufficiently isolate the noise caused by interference from the "noise floor power level" of the radio receiver.

An aim of the invention is thus to improve upon a prior art system such as the one in FIG. 1 by means of determining a scale factor which is applied to estimated values of the noise floor power level, such as those which are estimated by, for example, an estimator such as the estimator 115 of FIG. 1. It is however stressed that the invention can be applied to values which are estimated either by means of sliding window methods or recursive methods, or, in principle, by any other method.

The scale factor q(t) is determined as follows, which will be described with reference to the flow chart 200 of FIG. 2: estimated values of the noise floor power level are received, step 205, from an estimator such as the one 115 in FIG. 1. The received estimated values are sorted by time bins, step 210, where the time bins are N predetermined portions of a predetermined time cycle. As an example, the predetermined time cycle can be a 24 hour period, where each time bin is one of the 24 hours, and N then becomes 24. Alternatively, the time cycle can be a week, i.e. 7*24 hours, in which case the time bins are suitably still the hours of the time cycle. In some embodiments, the received estimated values of the noise floor power level are stored, step 207.

The average value $\bar{x}$ of the received values in each time bin for at least one previous time cycle are determined, step 215. The term "previous cycle" is here used in the sense that it refers to a time cycle which has preceded the current one. The current time cycle is referred to in FIG. 2 as time cycle L, and the previous time cycle is then referred to as time cycle L-M, where M is a positive integer ≥1. In some embodiments, the averages are stored, as shown in step 217, in order to find the smallest average value of the time bins in the previous time cycle.

A scale factor is determined, step 220, for each time bin k in the current time cycle, where k is in the integer interval [1,N] and where the current time cycle is referred to as time cycle L. This is done by means of dividing the average value of each time bin k in the previous time cycle, i.e. time cycle L-M, by the smallest average value of the time bins in the previous time cycle. The result of this division for time bin k in the previous time cycle L-M is used as scale factor for time bin k in the current time cycle L. Thus, using the example of two immediately adjacent time cycles which are 24 hour periods, and using the hours of the time cycles as the time bins, with the second 24 hour period as the current time cycle, the scale factor for the time bins of the current time cycle, i.e. hours 25-48, is determined as follows: assume that it is hour 5 that has the smallest average value of hours 1-24. The scale factor for each hour 25-48 is then determined by dividing the average value for each hour in the previous time cycle, i.e. the average values for hours 1-24, by the smallest average value of the hours 1-24, in this example the average value of hour 5.

In this manner, 24 scale factors are obtained, which can be numbered as 1-24 by their hours. Scale factors 1-24 obtained in this way are then used for hours 1-24 of the current time cycle: in other words, the scale factor obtained by dividing the average value of hour 1 by the average value of hour 5 in the previous time cycle is used for hour 1 in the current time cycle, i.e. hour 25, and the scale factor obtained by dividing the average value of hour 2 by the average value of hour 5 in the previous time cycle is used for hour 2 in the current time cycle, i.e. hour 26, etc. In this manner, scale factors are obtained for all of the hours (time bins) of the current time cycle.

Since scale factors have now been obtained for each of the time bins in the current time cycle, compensated noise floor power levels for the current time cycle can be determined, step 225, which is done by applying the scale factor of the current time bin to the estimated values of the noise floor power level which are received. As an example, for an estimated value received at time 17:12 of the current time cycle (sticking to the example of 24 hour periods as time cycles), the scale factor of time bin 18 of the current time cycle is used.

The scale factor can be applied to the received estimated values in a number of different ways, depending on how the scale factor is determined and how the compensated noise floor power level is to be used, but in one example, the currently received estimated value of the noise floor power level is divided by the scale factor of the current time bin. In the example used above, this would mean dividing the estimated value received at 17:12 of the current time bin by the scale factor of time bin 18 of the current time cycle.

Some embodiments of the method also comprise determining and storing the average value of the received values in each time bin for the current time cycle for use in determining a scale factor for a coming time cycle.

Figure 3:
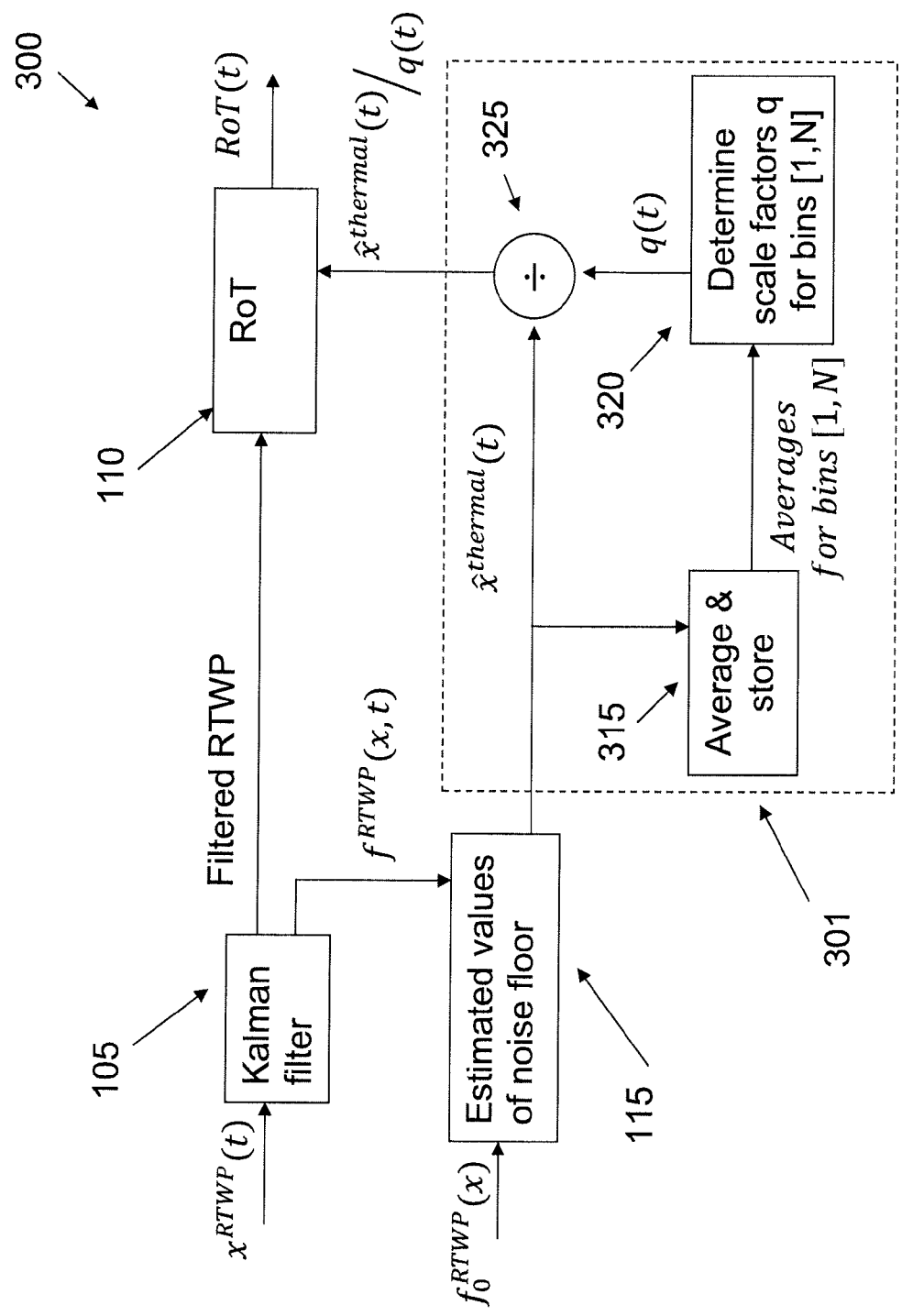
FIG. 3 shows an embodiment of the invention.

A system 300 which uses the invention is shown in FIG. 3, where reference numbers from FIG. 1 have been retained for corresponding components. The system 300 will be described in the following as a system in which scale factors are determined on a continuous basis, although it should be understood that in some embodiments, the scale factors need only be determined for the current time cycle, which is then done by means of estimated values of the noise floor power level from one previous time cycle, suitably the time cycle immediately preceding the current one. In addition, the system 300 will be described as storing received estimated values of the noise floor power level, in order to determine the averages, as well as storing the determined averages in order to find the smallest average. Again, this is merely one example of a suitable embodiment, both the averages and the smallest average can, for example, be determined "on the fly" instead.

The system 300 comprises the components of the system 100 of FIG. 1, and as shown by means of dashed lines, the system 300 also comprises a device of the invention, indicated as 301 in FIG. 3. As shown in FIG. 3, the system 300 by means of the invention 301 determines a scale factor q for each time bin k in a time cycle, and the proper q(t) is applied to the estimated values $\tilde{x}^{thermal}(t)$ of the noise power floor from the estimator 115. The proper q(t) is chosen by finding the correct time bin of the time t, as explained above in the example where the time t was 17:12 and the correct time bin was then time bin number 18.

In the example of FIG. 3, the scale factor q(t) is shown as being applied to $\tilde{x}^{thermal}(t)$ by means of division, i.e. $\tilde{x}_{thermal}(t)/q(t)$ in a component 325 for division. However, it should naturally be understood that the scale factor q(t) can also be determined such that it instead should be multiplied by $\tilde{x}^{thermal}(t)$, i.e. $q(t)*\tilde{x}_{thermal}(t)$. The scale factor is then determined as the inverse of the scale factor $\tilde{x}^{thermal}(t)$ The invention is shown in FIG. 3 as comprising two main components apart from the component 325 for division: one component 315 for averaging and storing, and one component 320 for determining the scale factor for bin k using the input from the component 315. The function of the component for averaging and storing 315 corresponds to steps 205-217 of FIG. 2, and the function of the component 320 for determining the scale factor corresponds to step 220 of FIG. 2. It should be pointed out that the division of the tasks carried out by of the invention in the components 315 and 320 is merely one of many ways in which the invention can be implemented.

The function of the components 315 and 320 and will now be explained more closely.

The averaging and storing component 315 uses a running time cycle, $I_x$, typically of a length of one day or one week, which thus corresponds to the time cycles mentioned previously. As also explained previously, this time cycle is then divided into time bins, $i_i^x=[t_i^{low}, t_i^{high}]$, i=1 . . . N, which as mentioned typically represent one hour each.

The averaging and storing component 315 also uses an internal bias estimation time, $t_j^{bias}$ which, for example, may be initialized when the load estimation functionality of the NodeB is started, since the load estimation involves determining the RoT. The internal bias estimation time $t_j^{bias}$ is reset by a modulo operation when the end of a time cycle has been reached, i.e. as:

$$t_j^{bias}=\mathrm{mod}(t_{j-1}^{bias}+\Delta t, t_N^{high}-t_1^{low})$$

where $\Delta t$ is the time between noise power floor updates in the estimator 115. An example of a typical such time $\Delta t$ is 20 minutes.

The aim of the function of the averaging and storing component 315 is to estimate the average noise power floor in each time bin, in order to capture the estimated noise floor variations over the time cycle, e.g. the day, week, etc, and to then, in one example of an embodiment, store this value for each time bin.

Updates are performed in the averaging and storing component 315 as updates of the estimated noise floor power level are received from the estimator 115, and are performed as follows:

$$x_i^{thermal}(t_j^{bias})=\alpha x_i^{thermal}(t_{j-1}^{bias})+(1-\alpha)\tilde{x}^{thermal}(t_j^{bias}),$$
$$\text{with } t_j^{bias} \subset i_i^x=[t_i^{low},t_i^{high}]$$

where $\alpha$ is an adaptation time constant, suitably selected to be significantly larger than $I_x$, and where the following is also assumed for the sake of simplicity: $t_{j-1}^{bias} \in i_i^x=[t_i^{low}, t_i^{high}]$ In order to avoid update transients, the noise power floor variables, corresponding to the previous complete update of all bins are stored and used for bias compensation.

Note that the above description of the function of the averaging and storing component 315 assumes power levels expressed in the linear domain, i.e. as [W]. In case of very large daily variations, it may instead be beneficial to express and update the powers in the logarithmic domain instead, i.e. as [dBm].

Figure 2:
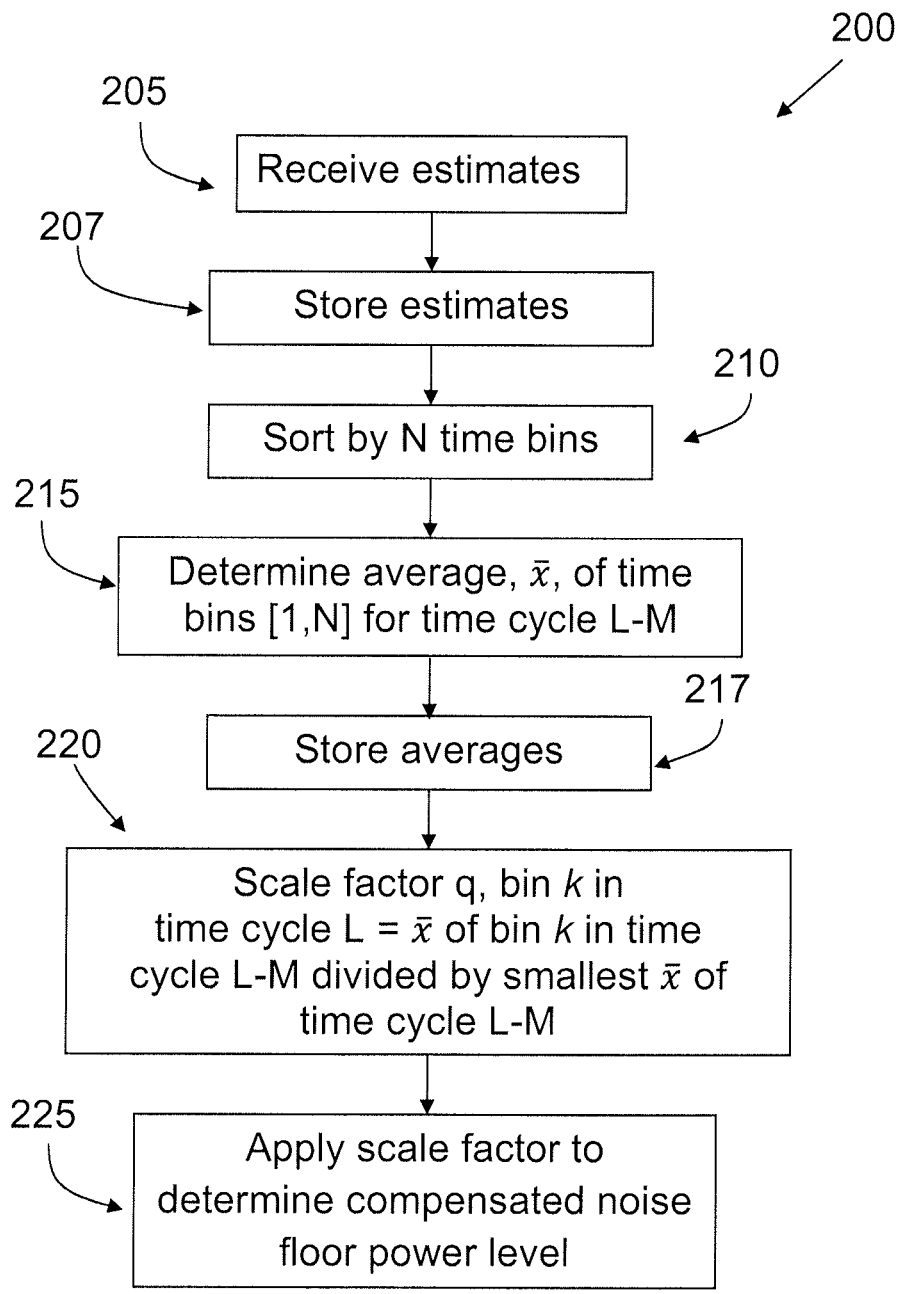
FIG. 2 shows a flow chart of a method of the invention.

The component 320 for determining the scale factor corresponds to step 220 of FIG. 2, and functions in the following manner:

The component 320 determines a scale factor to be applied to the "raw" estimate of the noise power floor as received from an estimator such as the one 115 in FIGS. 1 and 2. A principle used here is that the minimum estimate noise floor value over the cycle $I_x$, i.e.

$$x_{i_{min}}^{thermal}=\min_n(x_i^{thermal}, i=1\ldots N)$$

is first determined from the (complete last update) of the noise power floor variables of all bins, i.e. per day, week or in general, the time cycle which is divided into the N bins. Then it is checked which time cycle $i_i^x=[t_i^{low}, t_i^{high}]$, i=1 . . . N that the current bias estimation belongs to, and a scale factor k(t) is computed as:

$$k(t)=\frac{x_i^{thermal}}{x_{i_{min}}^{thermal}}, t_j^{bias} \in i_i^x=\left[t_i^{low}, t_i^{igh}\right]$$

This scale factor k(t) expresses the factor by which the estimated noise power floor is above the minimum value, as taken over the cycle $I_x$. This means that a division of the estimated noise power floor received from the estimator 115 by this scale factor will, at least ideally, compensate for the rise of the noise power floor due to daily variations of the traffic. The compensated value $\tilde{x}_{compensated}^{thermal}(t)$ of the estimate $\tilde{x}^{thermal}(t)$ is obtained as:

$$\hat{x}_{compensated}^{thermal}(t)=\frac{\hat{x}^{thermal}(t)}{k(t)}$$

as is shown at block 325 in FIG. 3. Note that the value of the scale factor is held constant at least until the next update of the noise power floor level from the estimator 115. This is due to the fact that the components 315 and 320 should operate at the same rate.

In order to assess the performance of the invention, a simulation over 30 days has been performed. The data was a mix of speech and data traffic, which was organized so as to generate traffic variations over the day. The true thermal noise power floor was −106.5 dB, and a recursive noise power floor estimation method was applied with a time constant of 1 hour. The adaptation rate of the bias estimation algorithm was 5 days.

A number of performance parameters were then calculated with and without the invention, i.e. with and without the bias estimation and bias compensation of FIG. 2. The values are based on the last 15 days of the simulation, after initial convergence of the bias estimator. The values obtained are shown in the table in FIG. 4.

Figure 5:
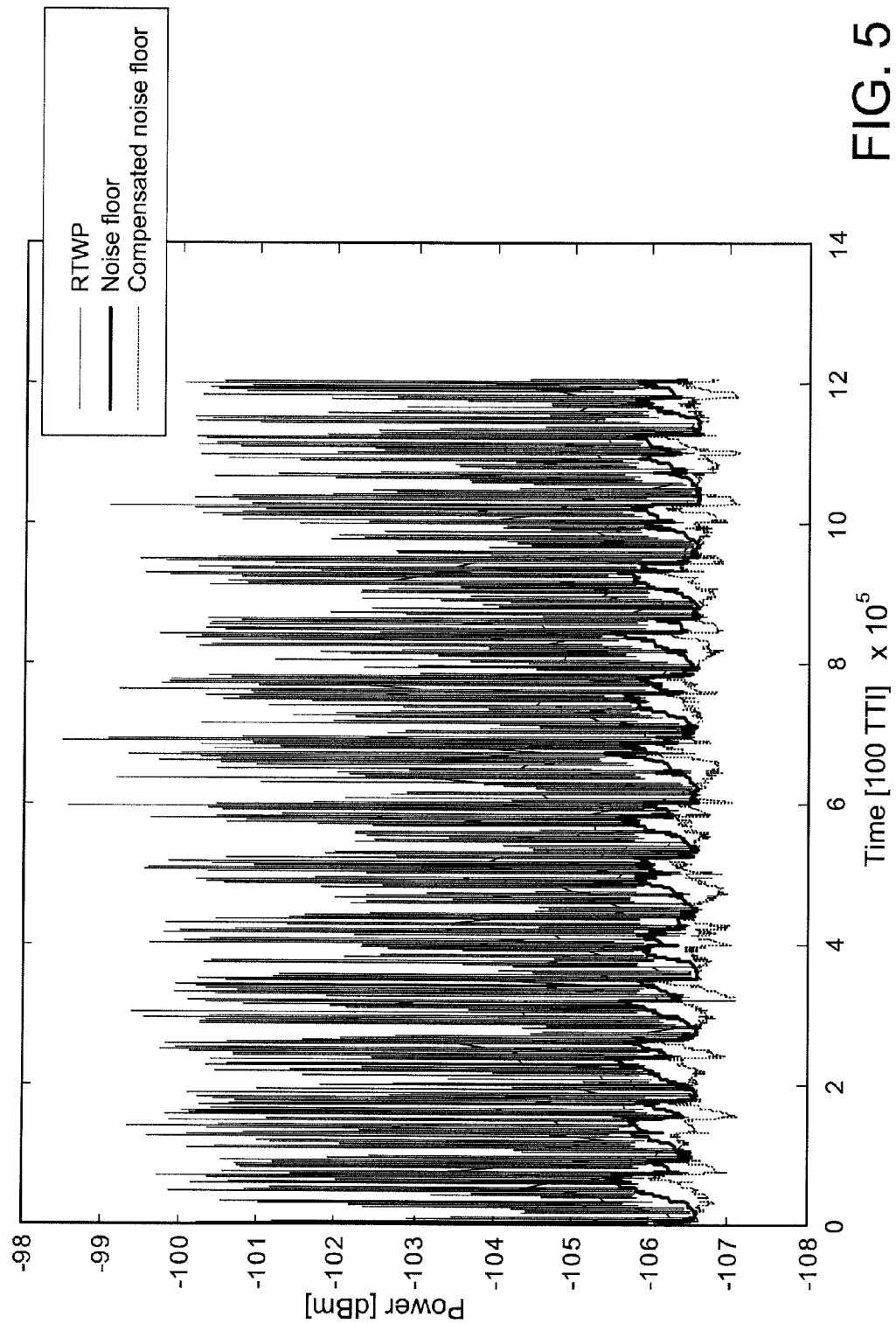
Figure 6:
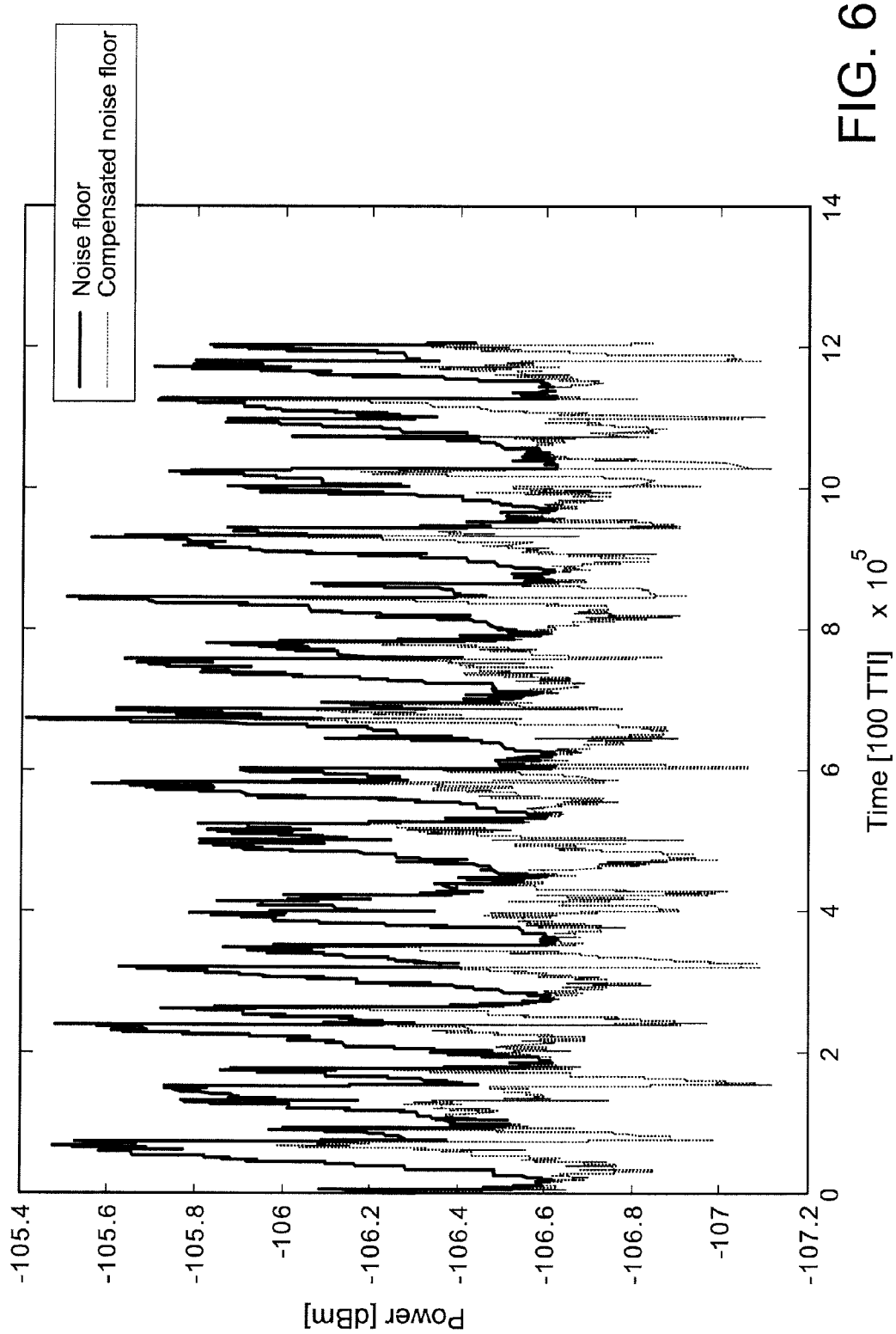
Figure 7:
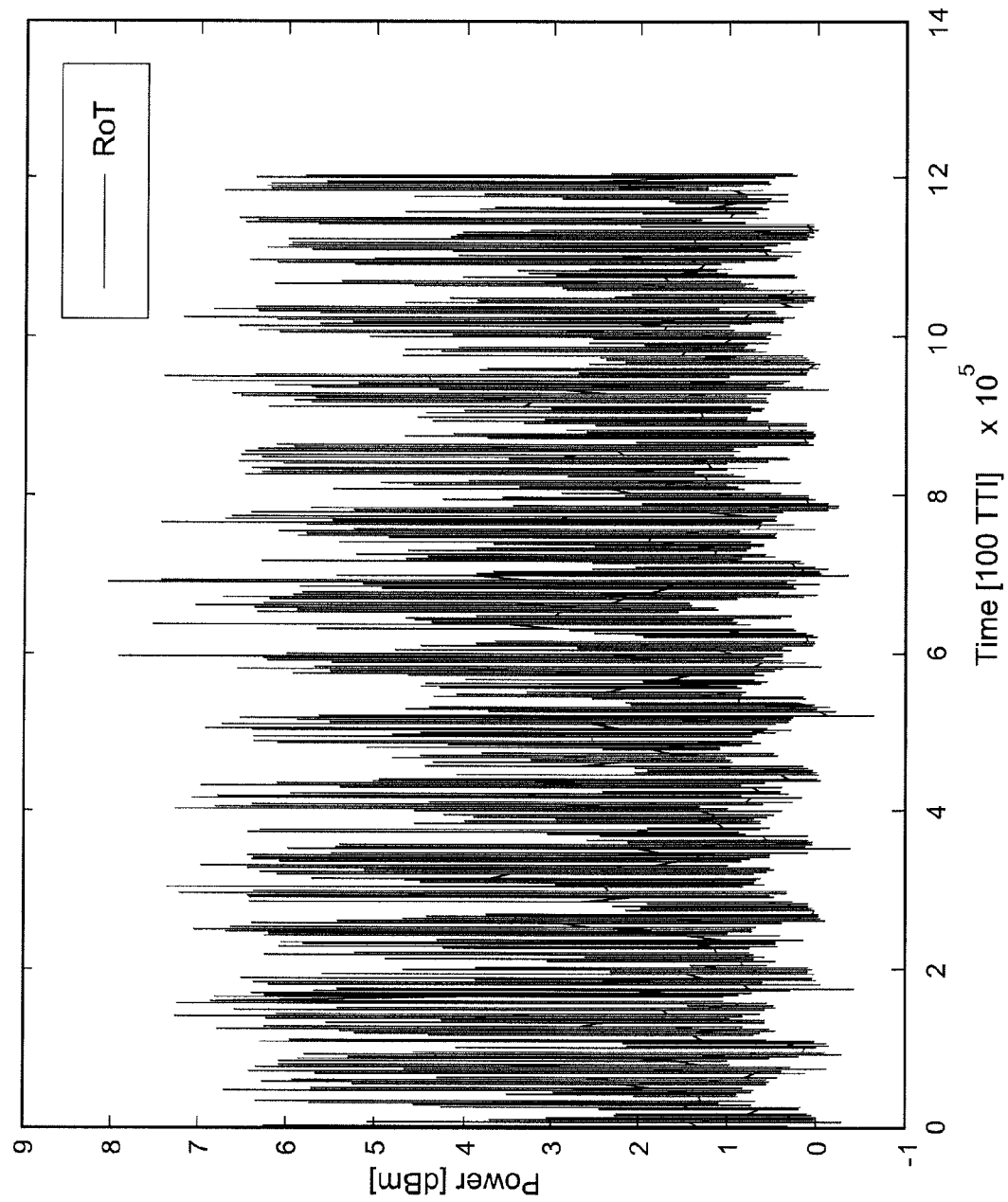

Results obtained by means of the invention are also shown in FIGS. 5-7: FIG. 5 shows the data traffic variation, expressed as RTWP, over time, together with the variation of the noise floor, with and without application of the invention, and FIG. 6 shows the variation of the estimated noise power floor without and with the invention, the latter being indicated as "compensated noise floor". Finally, FIG. 7 shows the estimated noise rise using the invention.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A method for determining a noise floor power level in a radio receiver, the method comprising:
   receiving estimated values of the noise floor power level;
   sorting the received estimated values by time bins, the time bins being N predetermined portions of a predetermined time cycle;
   determining an average value of the received values in each time bin for a previous time cycle;
   determining a scale factor for each time bin k in the current time cycle by dividing an average value of each time bin k in the previous time cycle by a smallest average value of the time bins in the previous time cycle;
   determining a compensated noise floor power level for each time bin in the current time cycle by applying the scale factor of the current time bin to the currently received estimated value of the noise floor power level.

2. The method of claim 1 further comprising:
   storing the received estimated values of the noise power floor;
   determining the average values of the time bins in the previous time cycle based on the stored received estimated values of the noise power floor.

3. The method of claim 1 further comprising:
   storing the average value of the received values in each time bin for the previous time cycle;
   determining the smallest average value of the time bins in the previous time cycle after all average values of the time bins in the previous time cycle have been stored.

4. The method of claim 1, further comprising determining and storing an average value of the received values in each time bin for the current time cycle for use in determining a scale factor for a future time cycle.

5. The method of claim 4, wherein the future time cycle is the immediately next time cycle.

6. The method of claims 1, wherein the applying the scale factor of the current time bin to the currently received estimated value of the noise floor power level comprises dividing the currently received estimated value of the noise floor power level by the scale factor of the current time bin.

7. The method of claim 1, wherein the previous time cycle used in determining the scale factors for the current time cycle is the time cycle immediately preceding the current time cycle.

8. The method of claim 1, wherein the predetermined time cycle is a 24 hour period and N equals 24.

9. A device for determining a noise floor power level in a radio receiver, the device comprising:
   one or processing circuits, the processing circuits configured to operate as:
      an averaging circuit configured to:
         receive estimated values of the noise floor power level;
         sort the received estimated values by time bins, the time bins being N predetermined portions of a predetermined time cycle;
         determine an average value of the received values in each time bin for a previous time cycle;
      a scale factor circuit configured to:
         receive, from the averaging circuit, the average values of the bins for the previous time cycle;
         determine a scale factor for each time bin k in the current time cycle by dividing an average value of each time bin k in a previous time cycle by a smallest average value of the time bins in the previous time cycle;
      a determining circuit configured to determine a compensated noise floor power level for each time bin in the current time cycle by applying the scale factor of the current time bin to the currently received estimated value of the noise floor power level.

10. The device of claim 9, wherein the averaging circuit is configured to:
    store the received estimated values of the noise power floor;
    determine the average values of the time bins in the previous time cycle from the stored received estimated values of the noise power floor.

11. The device of claim 9:
    further comprising storage configured to store the determined average values of the time bins in the previous time cycle;
    wherein the device is configured to find the smallest average value of the time bins in the previous time cycle after all of the average values of the time bins in the previous time cycle have been stored.

12. The device of claim 9, wherein the device is configured to determine and store the average value of the received values in each time bin for the current time cycle for use in determining a scale factor for a future time cycle.

13. The device of claim 12, in which the future time cycle is the immediately next time cycle.

14. The device of claim 9, wherein the determining circuit is configured to apply the scale factor of the current time bin to the currently received estimated value of the noise floor power level by dividing the currently received estimated value of the noise floor power level by the scale factor of the current time bin.

15. The device of claim 9, wherein the scale factor circuit is configured to use the time cycle immediately preceding the current time cycle as the previous time cycle in determining the scale factor.

16. The device of claim 9, wherein the averaging circuit is configured to use a 24 hour period as the predetermined time cycle, with N being set to equal 24.

* * * * *

UNITED STATES PATENT AND TRADEMARK OFFICE
CERTIFICATE OF CORRECTION

PATENT NO. : 8,787,858 B2
APPLICATION NO. : 13/988684
DATED : July 22, 2014
INVENTOR(S) : Wigren Page 1 of 1

It is certified that error appears in the above-identified patent and that said Letters Patent is hereby corrected as shown below:

In the Specification

In Column 8, Line 4, delete " $x_{i_{min}}^{thermal} = \text{mi}_n(x_i^{thermal}, i=1\ldots N)$ " and insert -- $x_{i_{min}}^{thermal} = \min(x_i^{thermal}, i=1\ldots N)$ --, therefor.

In Column 8, Lines 13-15, delete " $k(t) = \frac{x_i^{thermal}}{x_{i_{min}}^{thermal}}, t_j^{bias} \in t_i^x = [t_i^{low}, t_i^{high}]$ " and insert -- $k(t) = \frac{x_i^{thermal}}{x_{i_{min}}^{thermal}}, t_j^{bias} \in t_i^x = [t_i^{low}, t_i^{high}]$ --, therefor.

In Column 8, Lines 27-28, delete " $\hat{x}_{compensated}^{thermal}(t) = \frac{\hat{x}^{thermal}(t)}{k(t)}$ " and insert -- $\hat{x}_{compensated}^{thermal}(t) = \frac{\hat{x}^{thermal}(t)}{k(t)}$ --, therefor.

In the Claims

In Column 10, Line 7, in Claim 6, delete "claims" and insert -- claim --, therefor.

Signed and Sealed this
Nineteenth Day of May, 2015

Michelle K. Lee
*Director of the United States Patent and Trademark Office*